United States Patent
Sipher et al.

(10) Patent No.: US 9,882,865 B1
(45) Date of Patent: Jan. 30, 2018

(54) MULTIPLE PHONE NUMBERS FOR MOBILE DEVICE

(71) Applicant: Pinger, Inc., San Jose, CA (US)

(72) Inventors: Joseph K. Sipher, Sunnyvale, CA (US); Elita Ng, Mountain View, CA (US); Margi Patel, San Jose, CA (US)

(73) Assignee: Pinger, Inc., San Jose, CA (US)

( * ) Notice: Subject to any disclaimer, the term of this patent is extended or adjusted under 35 U.S.C. 154(b) by 82 days.

(21) Appl. No.: 15/200,974

(22) Filed: Jul. 1, 2016

(51) Int. Cl.
 *H04L 29/12* (2006.01)
 *H04M 3/42* (2006.01)
 *H04M 1/57* (2006.01)
 *H04W 80/12* (2009.01)
 *H04W 88/02* (2009.01)

(52) U.S. Cl.
 CPC ........ *H04L 61/1547* (2013.01); *H04M 1/576* (2013.01); *H04M 3/42042* (2013.01); *H04M 3/42102* (2013.01); *H04L 61/605* (2013.01); *H04W 80/12* (2013.01); *H04W 88/02* (2013.01)

(58) Field of Classification Search
 CPC .............. H04L 61/1547; H04L 61/605; H04M 3/42102; H04M 3/42042; H04M 1/576; H04W 88/02; H04W 80/12
 See application file for complete search history.

(56) References Cited

U.S. PATENT DOCUMENTS

| | | | | |
|---|---|---|---|---|
| 7,046,783 | B1* | 5/2006 | Bosik | H04M 3/42272 379/207.02 |
| 7,912,497 | B2* | 3/2011 | Isidore | H04M 1/72519 455/127.4 |
| 7,929,955 | B1* | 4/2011 | Bonner | H04M 3/42068 455/414.1 |
| 8,010,152 | B2* | 8/2011 | Kim | H04W 12/08 455/551 |
| 2003/0147519 | A1* | 8/2003 | Jain | H04M 3/42008 379/211.02 |
| 2004/0215845 | A1* | 10/2004 | Davani | H04M 1/247 710/22 |
| 2006/0141981 | A1* | 6/2006 | Lin | H04L 29/12122 455/403 |

(Continued)

OTHER PUBLICATIONS

BusinessCall, "A second line for your smart phone is here", pp. 1-8 (retrieved on Sep. 28, 2016 from http://gobusinesscall.com/).

*Primary Examiner* — Babar Sarwar
(74) *Attorney, Agent, or Firm* — Raubvogel Law Office

(57) ABSTRACT

According to various embodiments, a user can receive voice calls using multiple phone numbers on a mobile device such as a smartphone. The voice calls can be carried via the wireless carrier associated with the mobile device, using the device's normal allowance for voice calls, without the need to use large amounts of data. In at least one embodiment, incoming voice calls are accurately identified as having been made to either the registered number for the device or an alternate number. In addition, in at least one embodiment, when a voice call is received at a device, the phone number, name, and/or other contact information for the originator of the call is/are provided to the user of the device. In at least one embodiment, any or all of these pieces of information can be provided to the user of the device for every incoming voice call.

56 Claims, 7 Drawing Sheets

(56) References Cited

U.S. PATENT DOCUMENTS

| | | | |
|---|---|---|---|
| 2007/0121863 A1* | 5/2007 | Nagel | H04W 12/02 379/161 |
| 2008/0159502 A1* | 7/2008 | Venkatesulu | H04M 1/57 379/142.06 |
| 2010/0020952 A1* | 1/2010 | Leung | H04M 3/42008 379/142.02 |
| 2010/0159946 A1* | 6/2010 | Cheung | H04M 3/4878 455/456.1 |
| 2011/0294472 A1* | 12/2011 | Bramwell | H04W 8/04 455/413 |
| 2011/0306330 A1* | 12/2011 | Sharp | H04M 1/57 455/417 |
| 2013/0254364 A1* | 9/2013 | Moganti | H04L 63/20 709/223 |
| 2013/0322612 A1* | 12/2013 | Petrack | H04M 3/42042 379/142.04 |
| 2013/0337802 A1* | 12/2013 | Morken | H04W 76/02 455/426.1 |
| 2015/0350399 A1* | 12/2015 | Feller | H04M 1/665 455/414.1 |
| 2015/0363721 A1* | 12/2015 | Kadosh | G06Q 10/06311 705/7.13 |
| 2016/0100051 A1* | 4/2016 | Yliaho | G06F 21/6254 455/415 |
| 2017/0041461 A1* | 2/2017 | Sauln | H04M 3/42042 |

* cited by examiner

MULTIPLE PHONE NUMBERS FOR MOBILE DEVICE

FIELD

The present application relates to mobile devices such as mobile telephones, and infrastructure for supporting same.

DESCRIPTION OF THE RELATED ART

Mobile devices such as smartphones generally perform various communications-related functions, including the ability to handle voice calls, text messages, email messages, social networking, and the like. In general, incoming voice calls are forwarded to a device based on the device's phone number, referred to herein as the "registered number" for the device. Other types of identifiers and handles can be associated with the device for other forms of communication (such as email messages); however, a single phone number is generally used for receiving voice calls carried by the wireless carrier associated with the device.

Users often want the ability to receive voice calls using two different phone numbers on the same device. For example, it may be useful to have one number for personal use, and another for business use. Alternatively, a user may wish to receive a voice call without divulging the registered number associated with his or her mobile device. Thus, there are advantages to having a second phone number available for use on the same mobile device.

Existing techniques allow for call forwarding, in which calls to an alternate number (such as a land-line, Google Voice number, Skype number, or the like), can be forwarded to a user's mobile device. However, there are limitations associated with such approaches. Specifically, existing techniques do not generally provide a way for the user to be informed that the call was originated to the alternate number (rather than directly to the registered number of the device), while also being informed as to the number from which the call originated.

Another existing approach is to provide an app (such as Skype) that can be installed on a mobile device, and that can receive voice calls placed to a phone number associated with that app. However, such calls do not generally come through via the mobile device's native voice call functionality, requiring the user to open a separate app to receive the call. This can be inconvenient or confusing to users. Also, voice calls received in this manner are generally carried via VOIP or WiFi, and do not use the carrier network. Thus, if WiFi is not available, such voice calls use data; in situations where the user has a limited amount of data available (or where a reliable data connection is not available), such a mechanism for receiving voice calls may not be feasible.

Yet another existing approach is to provide two SIM cards, in a "dual-SIM" arrangement. However, such an approach requires additional SIM card functionality, whether in hardware or as a virtual SIM, and generally requires the cooperation of the mobile carrier and/or hardware provider.

SUMMARY

According to various embodiments, a user can receive voice calls using multiple phone numbers on a mobile device such as a smartphone, without any requirement for a second SIM card. The voice calls can be carried via the wireless carrier associated with the mobile device, using the device's normal allowance for voice calls, without the need to use large amounts of data. Since many wireless phone plans provide unlimited voice calls, the techniques described herein provide significant advantages over systems that use data or WiFi to carry calls or messages.

In addition, in at least one embodiment, incoming voice calls are accurately identified as having been made to either the registered number for the device or an alternate number. In addition, in at least one embodiment, when a voice call is received at a device, the phone number, name, and/or other contact information for the originator of the call is/are provided to the user of the device. In at least one embodiment, any or all of these pieces of information can be provided to the user of the device for every incoming voice call.

In at least one embodiment, a registered number is associated with a mobile device. This may be the number that is assigned to the mobile device by the wireless carrier. In addition, any number of alternate numbers are associated with the registered number. According to the techniques described herein, calls to those alternate numbers are forwarded to the registered number and thereby reach the same mobile device. In at least one embodiment, a central database maintains associations between alternate numbers and registered numbers.

In at least one embodiment, calls to an alternate number are identified as such on the receiving user's device, so that the user can see which number (registered or alternate) was called. In addition, in at least one embodiment, identifying information for the caller is displayed.

In at least one embodiment, the techniques described herein are implemented using an app installed on the user's device. Also provided is a central server that is able to send messages to the receiving user's device via a low power data channel, and is also able to forward voice calls to the user's device via a wireless carrier. Voice calls to alternate numbers are received at the central server and forwarded to the user's device; when forwarded, such calls are configured so that they appear to come from a "pilot number" associated with the central server.

In at least one embodiment, the user's device contains a contact record for the pilot number; such contact record can be automatically added to the user's device when the app is installed. As described in more detail below, just prior to forwarding a call to the user's device, the central server sends a message causing the app installed on the device to automatically alter the pilot number contact record on the device so as to indicate the alternate number and also indicate the identity of the caller.

In this manner, the call can be received and handled by the native voice calling functionality of the mobile device, which displays information about the incoming call based on its contact record for the pilot call. Since this contact record now identifies the caller and the fact that the call came to an alternate number, such information can be displayed to the user before and during the voice call. In at least one embodiment, upon conclusion of the call, the app automatically restores the pilot number contact record to its previous state.

Further details and variations are described herein.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 1 is a block diagram depicting a hardware architecture for a mobile device for receiving calls on an alternate number according to one embodiment.

DETAILED DESCRIPTION

Figure 1:
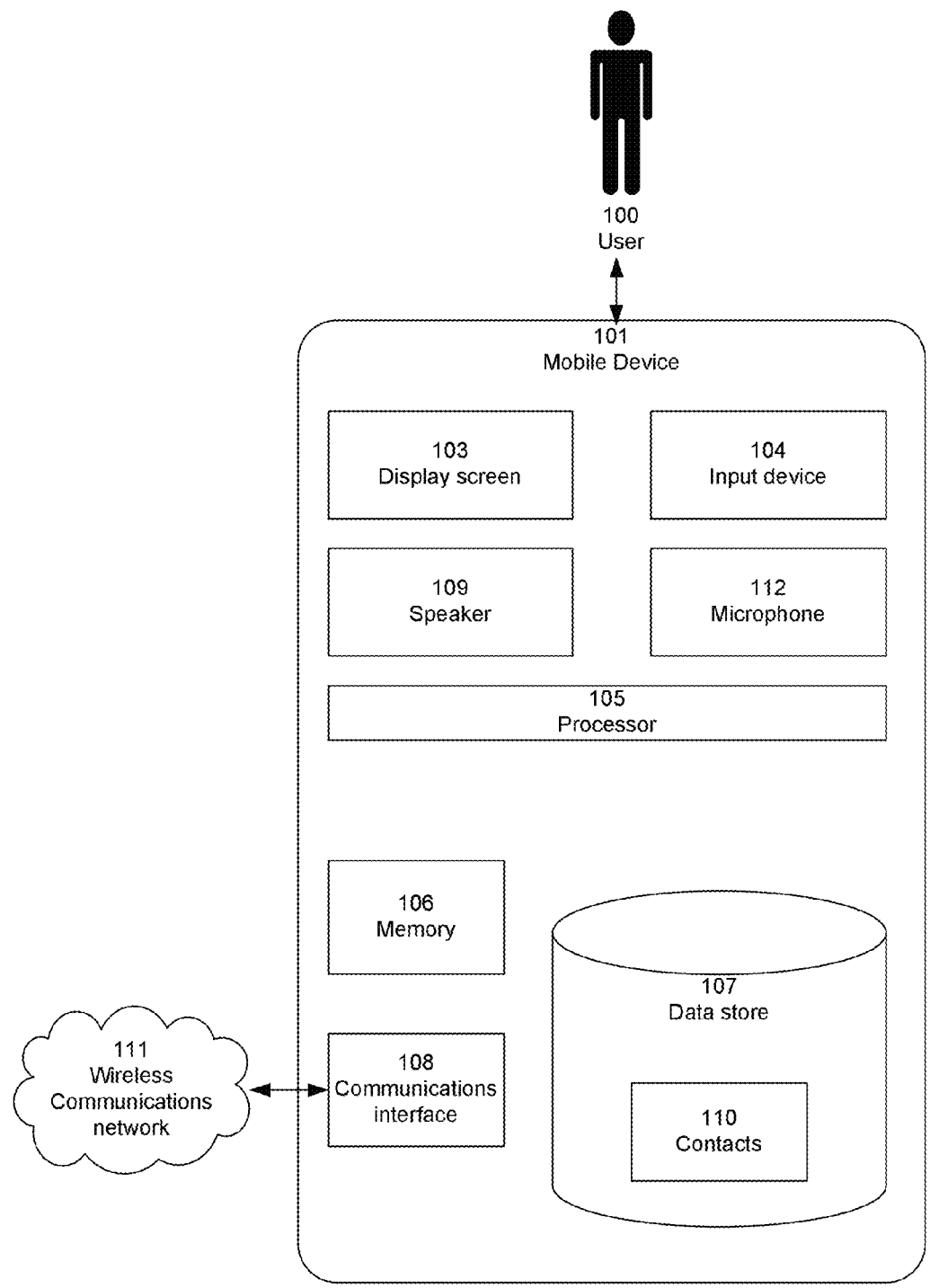

The various concepts, architectures, methods, and modes of operation described herein are intended as illustrative examples that can be implemented singly or in any suitable combination with one another. Some may be omitted and others included, as suitable for various embodiments. Accordingly, the following description and accompanying Figures merely set forth a subset of the possible embodiments, and are not intended to limit scope.

System Architecture

According to various embodiments, the techniques described herein can be implemented on any electronic device configured to receive and conduct voice calls. Such an electronic device may be, for example, a cellular telephone, smartphone, desktop computer, laptop computer, personal digital assistant (PDA), music player, handheld computer, tablet computer, kiosk, game system, television, or the like. Such a device may initiate and/or receive electronic communications in any of a number of modes, such as voice, text, email, instant message, chat, video chat, and the like. Communications may be implemented via any suitable communications network and according to any known communications protocol. Examples include the Internet, cellular telephone networks, EDGE, 3G, 4G, long term evolution (LTE), Session Initiation Protocol (SIP), Short Message Peer-to-Peer protocol (SMPP), SS7, Wi-Fi, Bluetooth, Hypertext Transfer Protocol (HTTP), Secure Hypertext Transfer Protocol (SHTTP), Transmission Control Protocol/Internet Protocol (TCP/IP), Apple Push Notification Service (APNS), Google Cloud Messaging (GCM), and/or the like, and/or any combination thereof. Communications may be secured, if appropriate, using any known security techniques such as, for example, a Virtual Private Network (VPN). Although the techniques are generally described herein in terms of voice calls received on a wireless telephone such as a smartphone via a wireless cellular telephone network, one skilled in the art will recognize that such techniques are applicable in other contexts as well.

In at least one embodiment, the techniques described herein include communication between a user's mobile device and a central server. Any suitable data transmission protocol can be used for such transmission, including any of the mechanisms mentioned above.

Although various aspects of the system are described herein in connection with an implementation on a smartphone, one skilled in the art will recognize that the techniques described herein can be implemented in other contexts, and indeed in any suitable device or service that enables electronic communication, whether by voice or by other means. Accordingly, the following description is intended to illustrate various embodiments by way of example, rather than to limit scope.

In one embodiment, the system is implemented, at least in part, as software running on a communications device. Such software can be in the form of an application (or "app") that can be downloaded (or otherwise obtained) and installed on the device. Alternatively, the functionality described herein can be included in software that is bundled with the device, such as operating system software, or delivered as a service to a device running a browser.

Referring now to FIG. 1, there is shown a block diagram depicting a hardware architecture for a mobile device for receiving calls on an alternate number according to one embodiment. Such an architecture can be used, for example, for implementing the techniques described herein in connection with a smartphone or other communications device, referred to herein as "mobile device 101" (or simple "device 101"). Device 101 may be any electronic device capable of initiating and/or receive voice calls; for example, smartphone, desktop computer, laptop computer, personal digital assistant (PDA), music player, handheld computer, tablet computer, kiosk, game system, television, or the like. In one embodiment, device 101 operates under the direction of user 100.

In one embodiment, device 101 is an iPhone, available from Apple Inc. of Cupertino, Calif., running an operating system such as iOS, also available from Apple Inc. of Cupertino, Calif. In other embodiments, device 101 may be based on the Android operating system, and is made by one of a large number of manufacturers including HTC, Samsung, Motorola, and Google. In yet other embodiments, device 101 may be based on the Blackberry operating system, Windows, or any other operating system known in the art of mobile devices.

In one embodiment, device 101 includes a number of hardware components as are well known to those skilled in the art. Input device 104 can be a keyboard, mouse, touchscreen, trackball, trackpad, five-way switch, voice input device, joystick, and/or any combination thereof. In embodiments wherein input device 104 is a touchscreen, a virtual keyboard and/or other input elements can be displayed thereon, according to known techniques. Display screen 103 is also provided, for displaying the user interface elements described herein, including communication buttons and other features. Microphone 112 and speaker 109 can be used for handling voice communication and providing alerts and/or notifications. Device 101 can also include other input and/or output device(s) (not shown), such as a camera(s), button(s), servomotor (for enabling vibrate alerts), and the like. Device 101 can be controlled in various ways, including voice control, according to well-known means. Device 101 can also include haptic output device (not shown) for providing feedback and output to user 100 via vibration or other similar techniques.

Processor 105 can be a conventional microprocessor for performing operations on data under the direction of software, according to well-known techniques. Memory 106 can be random-access memory having a structure and architecture as are known in the art, for use by processor 105 in the course of running software. Communications interface 108 may include any software and/or hardware for enabling communications via wireless communications network 111. Wireless communications network 111 may be a cellular network, a Wi-Fi network, and/or any other network known in the art. Wireless communications network 111 may include or may be connected to the Internet. Interface 108 may include a radio, for example, for enabling transmission and reception of data and/or voice signals across a cellular telephone network or other wireless network.

Data store 107 can be any magnetic, optical, and/or electrical storage device for storage of data in digital form; examples include flash memory, magnetic hard drive, CD-ROM, and/or the like. In one embodiment, data store 107 stores information describing contacts 110, according to well known means. For example, data store 107 can include names, phone numbers, addresses, email addresses, and/or image (such as photos) for any number of individuals, companies, or other entities. In one embodiment, such information is stored in a database in data store 107.

Data store 107 may further include application data (not shown) related to the operation of one or more applications on device 101. Data store 107 may include executable files, additional data files accessed by application programs, and/or the like.

One skilled in the art will recognize that the particular arrangement of hardware elements shown in FIG. 1 is merely exemplary, and that the techniques described herein can be implemented using different hardware elements configured in any of a number of different ways. Thus, the particular architecture shown in FIG. 1 is merely illustrative and is not intended to limit scope in any way. In alternative embodiments, the system can be implemented in other ways. For example, the system can be implemented in a client/server environment in which some or all of the data is stored remotely at a server, and wherein user 100 interacts with a client device that in turn communicates with the server. As another example, the system can be implemented using a web-based application. In another embodiment, these functions can be implemented in a peer-to-peer fashion, where there is no server managing the communication. In this application, the term "system" may include hardware and/or software components.

Figure 2:
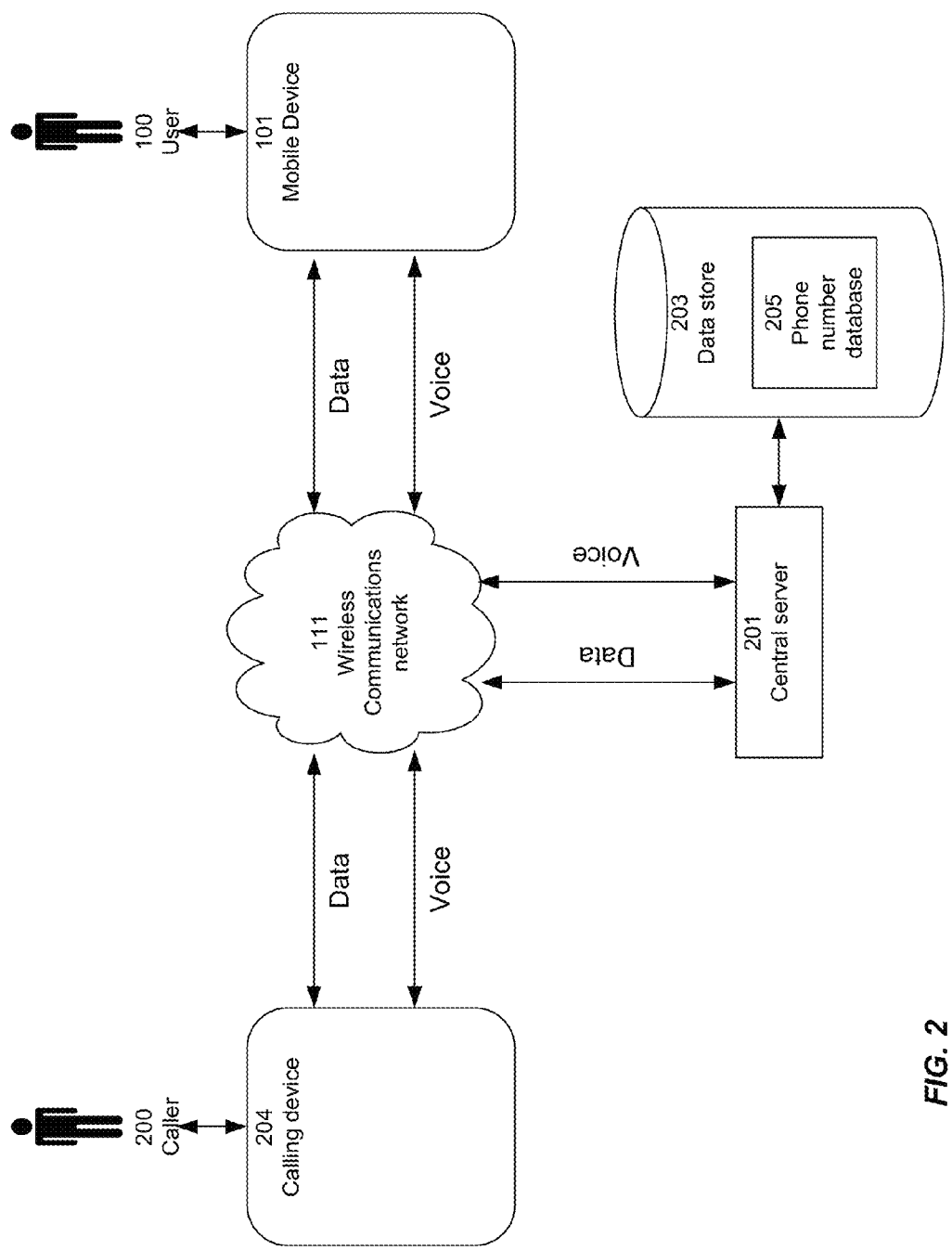
FIG. 2 is a block diagram depicting a system architecture for receiving calls on an alternate number according to one embodiment.

Referring now to FIG. 2, there is shown is a block diagram depicting a system architecture for receiving calls on an alternate number according to one embodiment. Mobile device 101, which may be configured as shown in FIG. 1 or may be configured in other ways, communicates via wireless communications network 111 to enable voice and/or data transmission to other components. Calling device 204, which may be a cellular telephone, smartphone, or other device, is also configured to communicate via wireless communications network 111. Thus, communications between device 204 and 101 can take place using known techniques for voice and/or data communications. For illustrative purposes, the techniques described herein are set forth in a context where the user of calling device 204 (referred to as caller 200) initiates a voice call intended for user 100, using an alternate number.

In addition, central server 201 is configured to communicate via network 111. Central server 201 can be implemented as one or more computing devices, operating to receive requests for data and respond to such requests. Any suitable protocol can be used for communication with server 201 via network 111. In at least one embodiment, server 201 is able to make and/or receive voice calls, to forward voice calls, and to interact with an app running on mobile device 101, as described in more detail below. In at least one embodiment, server 201 is able to send messages to device 101 via a low power data channel, and is also able to forward voice calls to device 101 via a voice channel implemented on network 111.

Data store 203 contains information used by server 201 in implementing the techniques described herein. Any suitable communications mechanisms and/or protocols can be used to enable the transmission of requests and responses between server 201 and data store 203. In at least one embodiment, data store 203 contains phone number database 205, which stores records associating registered numbers with alternate numbers. Central server 201 requests and retrieves such information from data store 203 as needed, so as to determine how incoming calls should be handled and to whom they should be forwarded, as discussed in more detail below.

One skilled in the art will recognize that the architecture depicted in FIG. 2 is merely exemplary, and that the described system can be implemented using any other suitable architecture, and using fewer or more components than those depicted.

Method

According to various embodiments, the system and method described herein allow user 100 to receive voice calls using multiple phone numbers on a single mobile device such as device 101.

In addition, in at least one embodiment, incoming voice calls are accurately identified as having been made to an alternate number for device 101. In addition, in at least one embodiment, when a voice call is received at device 101, the phone number, name, and/or other contact information for caller 200 is/are displayed at device 101. In at least one embodiment, both of these pieces of information can be displayed at device 101 for every incoming voice call.

In at least one embodiment, a registered number is associated with device 101. This may, for example, be the number that is assigned to device 101 by the wireless carrier. In addition, any number of alternate numbers are associated with the registered number. According to the techniques described herein, calls to those alternate numbers are forwarded to the registered number and thereby reach the same device 101. In at least one embodiment, phone number database 205 stored in data store 203 maintains associations between alternate numbers and registered numbers.

For illustrative purposes, the techniques described herein are set forth in a context where the user of calling device 204 (referred to as caller 200) initiates a voice call intended for user 100, using an alternate number associated with user 100.

In at least one embodiment, the techniques described herein are implemented using an app installed on device 101. Voice calls to alternate numbers are received at server 201 and forwarded to device 101; when forwarded, such calls are configured so that they appear to come from a "pilot number" associated with central server 201.

In at least one embodiment, data store 107 of device 101 contains a contact record for the pilot number; such contact record can be automatically added to device 101 when the app is installed. In at least one embodiment, just prior to forwarding a call to device 101, central server 201 sends a message causing the app installed on device 101 to automatically alter the pilot number contact record in data store 107 so as to indicate the alternate number and also indicate the identity of caller 200.

Incoming calls to the registered number associated with device 101 are handled normally; and identifying information for caller 200 can be displayed on device 101 according to known techniques, for example by displaying a name and/or image (if available) of caller 200 on display screen 103, as extracted from data store 107 on device 101.

Figure 3:
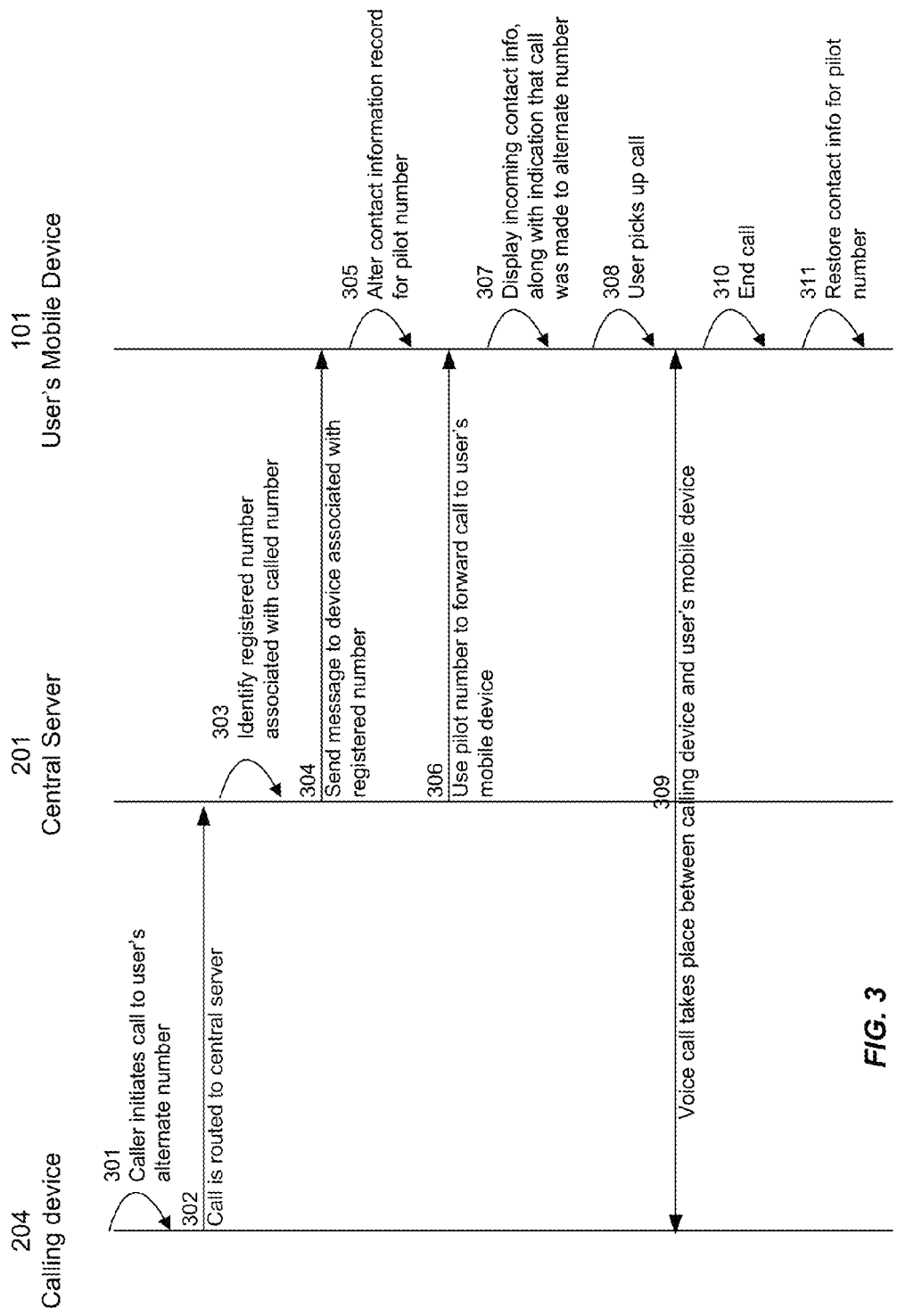
FIG. 3 is an event trace diagram depicting a method for receiving calls on an alternate number according to one embodiment.

Referring now to FIG. 3, there is shown an event trace diagram depicting a method for receiving calls on an alternate number associated with user 100 (or with device 101) according to one embodiment. One skilled in the art will recognize that the steps depicted in FIG. 3, and the components that perform the steps, are merely exemplary. Thus, for example, different components can perform the depicted steps and/or other steps, and/or the steps can be performed in a different order than is depicted.

In step 301, caller 200 (using calling device 204) initiates a voice call to an alternate number associated with user 100 (or with device 101). In step 302, such a call is automatically routed to central server 201. In at least one embodiment, all alternate numbers are associated with a provider of the service described herein. Thus, when caller 200 calls an alternate number, the Public Switched Telephone Network (PSTN) routes the call to central server 201 of the provider. In step 303, upon receiving such a call, central server 201 consults phone number database 205 in data store 203 to identify which registered number is associated with the called alternate number.

In step 304, central server 201 then sends a message to device 101, based on a determination that the identified registered number is associated with device 101. The message can be, for example, a push notification or any other type of notification, and can be sent via any suitable mechanism, such as a data channel, Apple Push Notification Service (APNS), Google Cloud Messaging (GCM), SMS channel, or the like. The message alerts device 101 that a call is coming in. In at least one embodiment, the message also provides caller identification for calling device 204 and/or caller 200 (such as for example the registered telephone number associated with calling device 204). In at least one embodiment, the message also includes an indication of which alternate number was called. In at least one embodiment, the message can include the name of the caller, if such information has been stored at data store 203 or is otherwise accessible to server 201.

Upon receiving the message, in step 305, device 101 alters the contact record stored in data store 107 for the pilot number, so that fields and/or images in the contact record for the pilot number indicate the use of an alternate number, and further indicate the identity of caller 200. For example, a name field can be changed to indicate the name of caller 200 (or a combination of the name of caller 200 and an indication of the fact that the call was made to an alternate number). The name can be extracted from a contact record 110 in data store 107 at device 101, or it may have been received by device 101 as part of the message that was sent in step 304.

Alternatively or additionally, the name field can be changed to include a brand name associated with the feature that facilitates calls to alternate numbers. Alternatively or additionally, a phone number field can be changed to indicate the phone number of caller 200 (or a combination of the phone number of caller 200 and an indication of the fact that the call was made to an alternate number).

Alternatively or additionally, a caller image can be changed to that of caller 200. Alternatively or additionally, the image or some portion of it (such as a background) can be changed to include a brand name, logo, distinctive color, and/or the like, associated with the feature that facilitates calls to alternate numbers. For example, in at least one embodiment, the caller image can be changed so that a distinctive background color is shown when calls are received at an alternate number.

Figure 4:
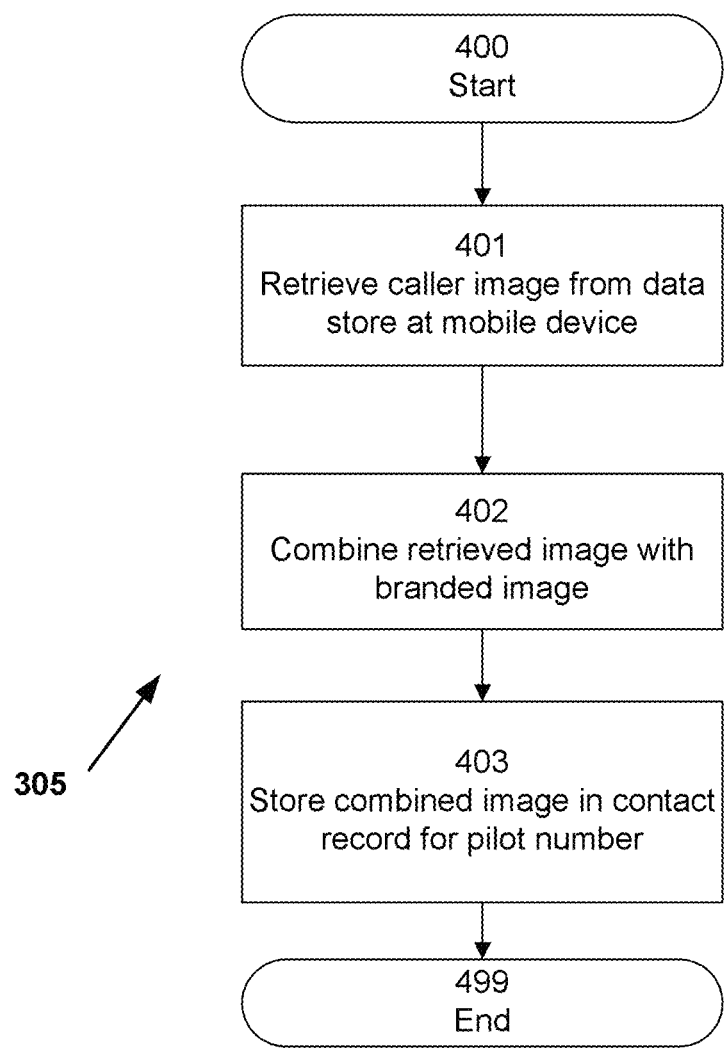
FIG. 4 is a flow diagram depicting a method of altering an image in a contact information record for a pilot number, according to one embodiment of the invention.

Referring now also to FIG. 4, there is shown a flow diagram depicting additional details for step 305, according to one embodiment. In step 401, device 101 retrieves an image (such as a photograph) associated with the caller; this image can be retrieved, for example, from a contact record 110 stored at data store 107 of device 101. In step 402, the retrieved image is combined with a branded image, such as logo, product name, or company name associated with the functionality for providing alternate phone numbers. In step 403, this combined image is stored in the contact record 110 for the pilot number associated with server 201.

One skilled in the art will recognize that the method depicted in FIG. 4. Other techniques can be used for combining stored information about the caller with a branded image, text, or other element that indicates that the call was placed to an alternate number. For example, in at least one embodiment, a text based identifier of the caller can be combined with a text-based indicator indicating a product name, or company name associated with the functionality for providing alternate phone numbers.

Referring again to FIG. 3, once step 305 is completed, in step 306, central server 201 forwards the voice call to device 101, using the pilot number associated with server 201 as the originating caller identifier. The call is placed using the normal wireless voice network, so that the native voice call functionality of device 101 receives and handles the call. In this manner, device 101 does not have to use wireless data or rely on WiFi, to receive a call at an alternate number.

In step 307, device 101 displays information for the incoming call. Since the call appears to be coming from the pilot number associated with server 201, the native voice call functionality of device 101 displays incoming contact information for the pilot number. Since the contact record for the pilot number has been altered (in step 305), the displayed contact information includes an indication of the actual caller's identity (or at least the phone number of calling device 204), and can also include an indication that the call was made to an alternate number (by displaying text to that effect, and/or a logo, color, and/or the like). In at least one embodiment, this display of actual caller identity along with identification that the call was made to an alternate number, and an indication of which alternate number was used (if there are more than one), is made possible by the dynamic altering of contact information in step 305, in response to the message received in step 304 for central server 201.

For example, the displayed contact information may show an image or name of the caller, along with a branded icon or text showing that the call was initiated to an alternate number rather than to the registered number for device 101. If more than one alternate number is associated with device 101, the displayed contact information can specify which alternate number was used.

In addition, since the call is handled by the native voice calling functionality of device 101, any other distinctive output can be presented for calls to the pilot number. For example, device 101 can be configured so that a distinctive ring tone or vibration is output for all calls coming from the pilot number. Since all calls to alternate numbers appear to come from the pilot number, the distinctive ring tone or vibration would be used whenever a call placed to an alternate number is received at device 100. In this manner, the native voice calling functionality of device 100 can be used to further alert user 101 that a call was placed to an alternate number.

In step 308, user 100 picks up the call as normal. In step 309, the voice call takes place as normal between calling device 204 and user's 100 mobile device 101. In step 310, the call is ended.

In at least one embodiment, in step 311, once the call has ended, device 101 automatically restores the contact information for the pilot number to its previous state. This step can be omitted, if desired, since the contact record can simply remain as is until it is altered again the next time a call comes in to an alternate number.

In at least one embodiment, changes to the contact records on the device 101 are performed automatically by the app installed on device 101. As describe above, in at least one embodiment, such changes are performed in response to receiving the message (in step 304) from server 201 that a call is coming in, and also (in step 311) at the conclusion of a voice call (so as to restore the previous state of the contact record).

Figure 5A:
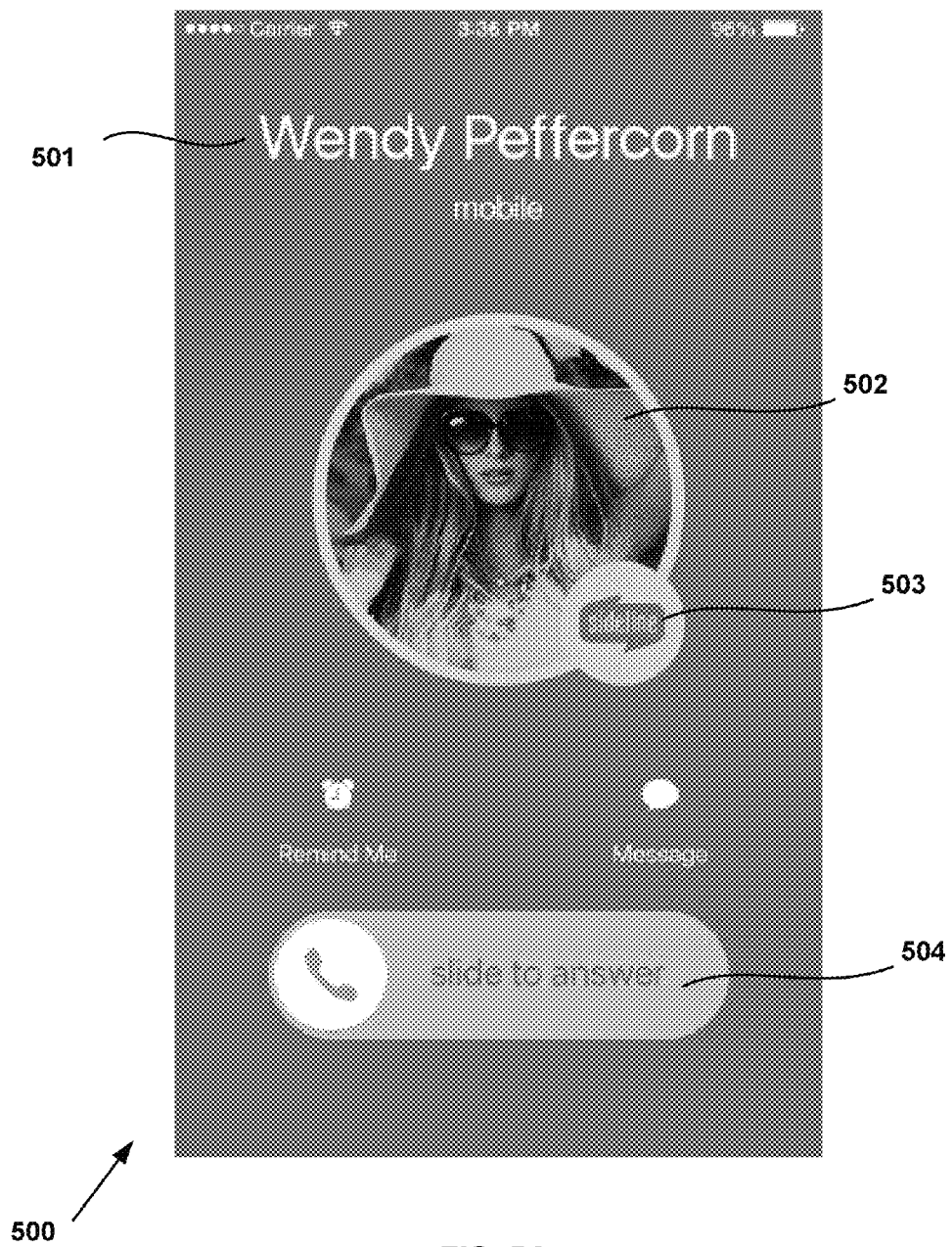
FIG. 5A is an exemplary screen shot depicting a display for an incoming call on an alternate number, according to one embodiment of the invention.

Referring now to FIG. 5A, there is shown an exemplary screen shot depicting a display 500 for an incoming call on an alternate number, according to one embodiment of the invention. Display 500 may be shown, for example, on display screen 103 of mobile device 101 in step 307 as described above (i.e., when the call is forwarded from server 201 using the pilot number). As described above, the native voice call functionality of device 101 is used to handle the call.

In this example, the contact record has been altered so that, upon receipt of an incoming call that appears to come from the pilot number, device 101 displays the caller's name 501, along with an image 502 of the caller that includes logo 503 indicating the alternate-number functionality. In this case the logo depicts the brand name "sideline", which is the name of the product that enables the alternate-number functionality. In at least one embodiment, the image associated with the contact can be further altered so that the background is displayed in a distinctive color (blue in this example); this further reinforces the fact that the call was made to the alternate number. Slider control 504 allows user 100 to answer the call.

Figure 5B:
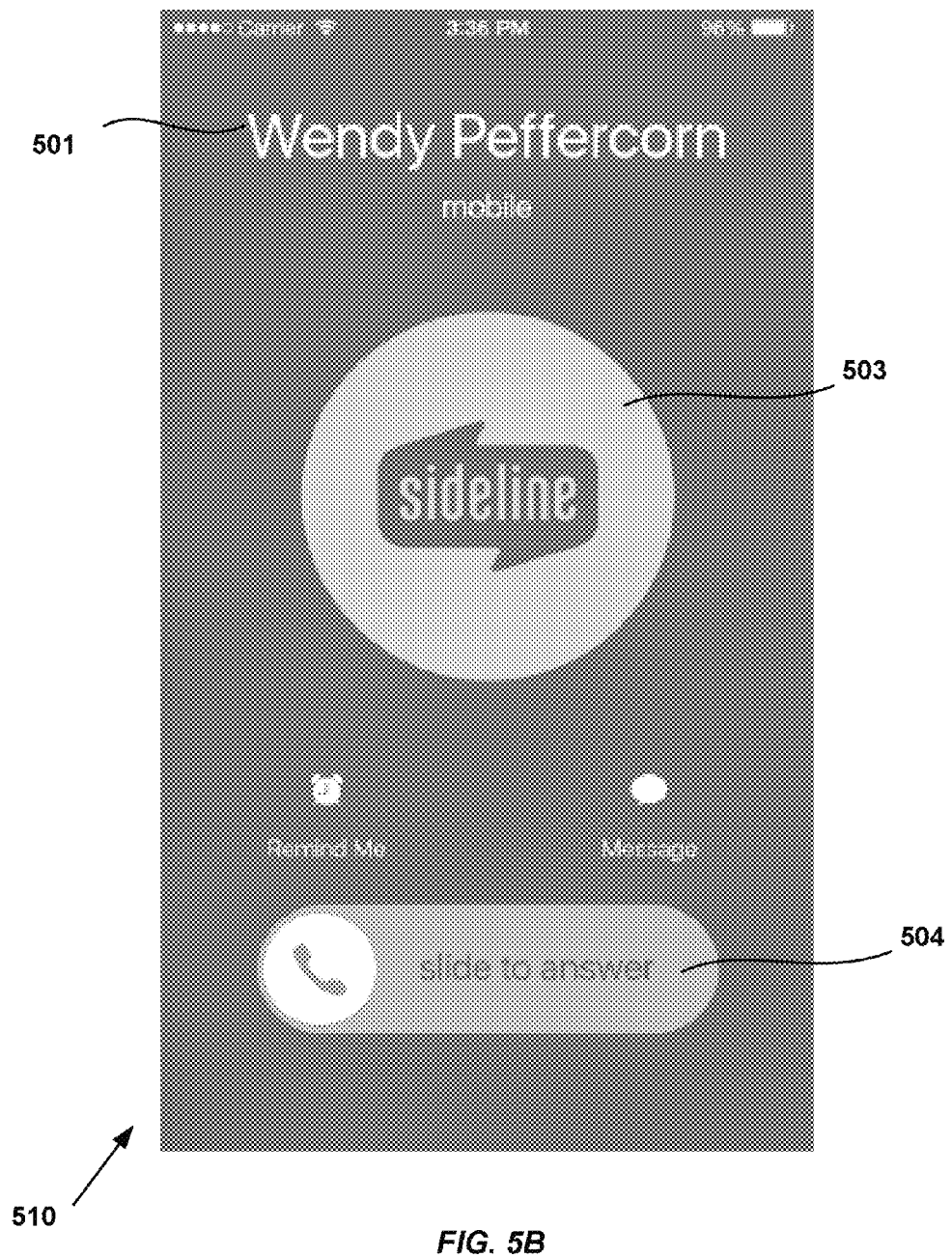
FIG. 5B is an exemplary screen shot depicting a display for an incoming call on an alternate number, when no image for the caller is available, according to one embodiment of the invention.

Referring now to FIG. 5B, there is shown an exemplary screen shot depicting a display 510 for an incoming call on an alternate number when no image for the caller is available, according to one embodiment of the invention. Display 510 may be shown, for example, on display screen 103 of mobile device 101 in step 307 as described above (i.e., when the call is forwarded from server 201 using the pilot number). As described above, the native voice call functionality of device 101 is used to handle the call.

In this example, since no image for the caller is available, the contact record has been altered to contain an image including large logo 503 indicating the alternate-number functionality where the caller image would otherwise go. Thus, upon receipt of an incoming call that appears to come from the pilot number, device 101 displays the caller's name 501, along with large logo 503. As described above in connection with FIG. 5A, the image associated with the contact can be further altered so that the background is displayed in a distinctive color (blue in this example), to further reinforce the fact that the call was made to the alternate number.

Figure 5C:
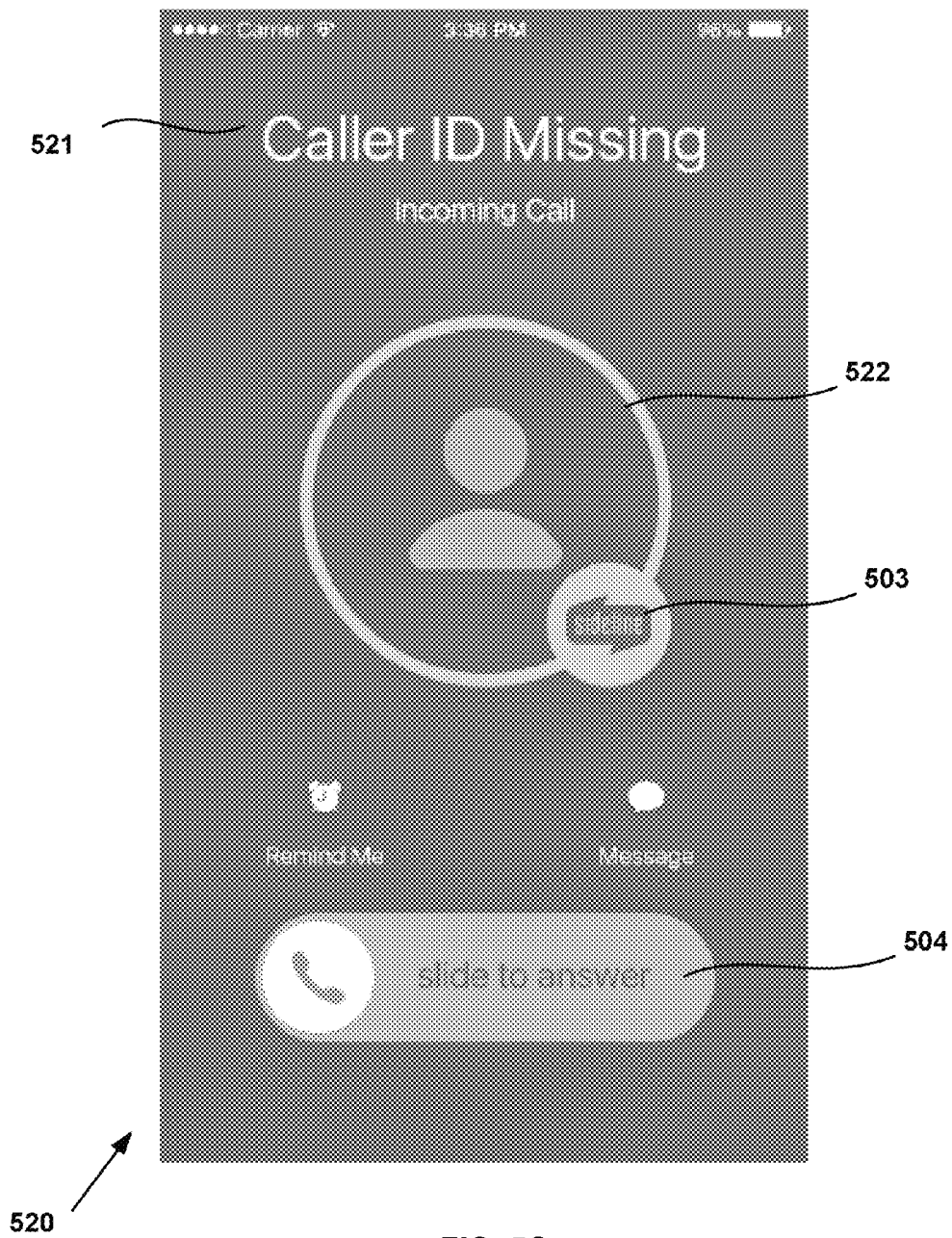
FIG. 5C is an exemplary screen shot depicting a display for an incoming call on an alternate number, when no caller identification is available, according to one embodiment of the invention.

Referring now to FIG. 5C, there is shown an exemplary screen shot depicting a display 520 for an incoming call on an alternate number when no caller identification is available, according to one embodiment of the invention. Display 520 may be shown, for example, on display screen 103 of mobile device 101 in step 307 as described above (i.e., when the call is forwarded from server 201 using the pilot number). As described above, the native voice call functionality of device 101 is used to handle the call.

In this example, since no caller identification is available, the contact record has been altered to contain an image including a generic "unknown person" icon 522 along with logo 503 indicating the alternate-number functionality. Thus, upon receipt of an incoming call that appears to come from the pilot number, device 101 displays a "Caller ID missing" indicator 521, along with icon 522 and logo 503. As described above in connection with FIGS. 5A and 5B, the image associated with the contact can be further altered so that the background is displayed in a distinctive color (blue in this example), to further reinforce the fact that the call was made to the alternate number.

The screen shots of FIGS. 5A through 5C are merely exemplary. Other displays and arrangements can be used. For example, in at least one embodiment, the pilot number contact record can be altered so that the contact name field includes a word or phrase (e.g. "Sideline") indicating that the call was placed to an alternate number. Then, upon receipt of the incoming call from the pilot number, the displayed text includes both the caller name (or "Caller ID missing", if the name is unavailable) along with the indication that the call was placed to an alternate number. Such a variation can be used instead of or in addition to alterations to the image as depicted and described above.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may be a general-purpose computing device selectively activated or reconfigured by a computer program stored therein and/or in other components. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the devices referred to herein may include a single processor or may be architectures employing multiple processor designs for increased computing capability. Further, any reference herein to a "device" can alternatively refer to one or more internal subsets of devices.

The algorithms and displays presented herein are not inherently related to any particular device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

In at least one embodiment, the system may be implemented using any suitable computing platform, whether wired or wireless, and whether stationary or mobile: examples include smartphones, tablet computers, laptop computers, desktop computers, and the like. For example, the system can be implemented on iOS devices such as the iPod, iPad, or iPhone, on any suitable Android devices, on a Windows-based device, or on a device with the Blackberry operating system.

Accordingly, various embodiments include software, hardware, and/or other elements for operation using a smartphone, computer system, computing device, or other electronic device, or any combination or plurality thereof. Such an electronic device can include, for example, a processor, an input device (such as a keyboard, mouse, touchpad, touchscreen, track pad, joystick, trackball, microphone, and/or any combination thereof), an output device (such as a screen, touchscreen, speaker, haptic output device, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for handling a voice call to an alternate telephone number, comprising, at a device having native voice call functionality:
    receiving a message indicating that a voice call has been made from a caller to an alternate telephone number associated with the device;
    responsive to receiving the message, automatically altering a stored contact record associated with a pilot number;

receiving a voice call forwarded to the device via a server using the pilot number;

responsive to receiving the call, automatically displaying information from the altered contact record; and responsive to a user accepting the call, establishing a voice connection to proceed with the voice call.

2. The computer-implemented method of claim 1, wherein the message further comprises caller identification pertaining to the caller.

3. The computer-implemented method of claim 2, wherein the caller identification comprises at least one selected from the group consisting of:

a caller telephone number; and a caller name.

4. The computer-implemented method of claim 1, wherein establishing a voice connection to proceed with the voice call comprises establishing a voice connection between the caller and the device using the native voice calling functionality of the device.

5. The computer-implemented method of claim 1, wherein altering the stored contact record associated with the pilot number comprises altering the record to identify a call as being directed to an alternate number.

6. The computer-implemented method of claim 1, wherein altering the stored contact record associated with the pilot number comprises adding text to a name field in the record to identify a call as being directed to an alternate number.

7. The computer-implemented method of claim 1, wherein altering a stored contact record associated with the pilot number comprises altering an image in the record to include a graphical indication that a call was directed to an alternate number.

8. The computer-implemented method of claim 7, wherein the graphical indication comprises at least one selected from the group consisting of:

a logo;

a brand name;

a text indicator;

a distinctive visual attribute; and a distinctive color.

9. The computer-implemented method of claim 1, wherein altering a stored contact record associated with the pilot number comprises altering an image in the record to combine an image representing the caller with a graphical indication that a call was directed to an alternate number.

10. The computer-implemented method of claim 9, wherein the graphical indication comprises at least one selected from the group consisting of:

a logo;

a brand name;

a text indicator;

a distinctive visual attribute; and a distinctive color.

11. The computer-implemented method of claim 1, further comprising:

upon completion of the voice call, restoring the stored contact record associated with the pilot number to its previous state.

12. The computer-implemented method of claim 1, wherein receiving a message comprises receiving a push notification.

13. The computer-implemented method of claim 1, wherein the step of automatically displaying information from the altered contact record is performed by the native voice calling functionality of the device.

14. The computer-implemented method of claim 1, wherein the device comprises a mobile device.

15. The computer-implemented method of claim 1, wherein the device comprises a wireless phone.

16. A computer-implemented method for handling a voice call to an alternate telephone number, comprising:

at a server, receiving a call made from a caller to a telephone number;

at a processor associated with the server, identifying the called number as an alternate number associated with a device having native voice call functionality;

at the processor, identifying a registered number associated with the called alternate number;

transmitting a message from the server to the device associated with the alternate number, the message comprising an indication of the called alternate number, so as to enable the device to display an indication that the call was placed to the alternate number; and using a pilot number associated with the server, forwarding the voice call from the caller to the registered number.

17. The computer-implemented method of claim 16, wherein the message further comprises caller identification pertaining to the caller.

18. The computer-implemented method of claim 17, wherein the caller identification comprises at least one selected from the group consisting of:

a caller telephone number; and a caller name.

19. The computer-implemented method of claim 16, wherein forwarding the voice call to the registered number comprises establishing a connection to facilitate a voice call between the caller and the device.

20. The computer-implemented method of claim 16, wherein transmitting a message comprises transmitting a push notification.

21. The computer-implemented method of claim 16, wherein the device comprises a mobile device.

22. The computer-implemented method of claim 16, wherein the device comprises a wireless phone.

23. A non-transitory computer-readable medium for handling a voice call to an alternate telephone number, comprising instructions stored thereon, that when executed by a processor on a device having native voice call functionality, perform the steps of:

receiving a message indicating that a voice call has been made from a caller to an alternate telephone number associated with the device;

responsive to receiving the message, automatically altering a stored contact record associated with a pilot number;

receiving a voice call forwarded to the device via a server using the pilot number;

responsive to receiving the call, causing a display to automatically display information from the altered contact record; and responsive to a user accepting the call, causing the device to establish a voice connection to proceed with the voice call.

24. The non-transitory computer-readable medium of claim 23, wherein the message further comprises caller identification pertaining to the caller.

25. The non-transitory computer-readable medium of claim 24, wherein the caller identification comprises at least one selected from the group consisting of:

a caller telephone number; and a caller name.

26. The non-transitory computer-readable medium of claim 23, wherein establishing a voice connection to proceed with the voice call comprises establishing a voice connection between the caller and the device using the native voice calling functionality of the device.

27. The non-transitory computer-readable medium of claim 23, wherein altering the stored contact record associated with the pilot number comprises altering the record to identify a call as being directed to an alternate number.

28. The non-transitory computer-readable medium of claim 23, wherein altering the stored contact record associated with the pilot number comprises adding text to a name field in the record to identify a call as being directed to an alternate number.

29. The non-transitory computer-readable medium of claim 23, wherein altering a stored contact record associated with the pilot number comprises altering an image in the record to include a graphical indication that a call was directed to an alternate number.

30. The non-transitory computer-readable medium of claim 29, wherein the graphical indication comprises at least one selected from the group consisting of:
a logo;
a brand name;
a text indicator;
a distinctive visual attribute; and
a distinctive color.

31. The non-transitory computer-readable medium of claim 23, wherein altering a stored contact record associated with the pilot number comprises altering an image in the record to combine an image representing the caller with a graphical indication that a call was directed to an alternate number.

32. The non-transitory computer-readable medium of claim 23, further comprising instructions stored thereon, that when executed by a processor on a device having native voice call functionality, perform the step of:
upon completion of the voice call, restoring the stored contact record associated with the pilot number to its previous state.

33. The non-transitory computer-readable medium of claim 23, wherein receiving a message comprises receiving a push notification.

34. The non-transitory computer-readable medium of claim 23, wherein causing a display to automatically display information from the altered contact record is performed by the native voice calling functionality of the device.

35. A non-transitory computer-readable medium for handling a voice call to an alternate telephone number, comprising instructions stored thereon, that when executed by a processor on a server, perform the steps of:
receiving a call made from a caller to a telephone number;
identifying the called number as an alternate number associated with a device having native voice call functionality;
identifying a registered number associated with the called alternate number;
causing a message to be transmitted from the server to the device associated with the alternate number, the message comprising an indication of the called alternate number, so as to enable the device to display an indication that the call was placed to the alternate number; and
using a pilot number associated with the server, causing the voice call from the caller to be forwarded to the registered number.

36. The non-transitory computer-readable medium of claim 35, wherein the message further comprises caller identification pertaining to the caller.

37. The non-transitory computer-readable medium of claim 36, wherein the caller identification comprises at least one selected from the group consisting of:
a caller telephone number; and
a caller name.

38. The non-transitory computer-readable medium of claim 35, wherein causing the voice call from the caller to be forwarded to the registered number comprises establishing a connection to facilitate a voice call between the caller and the device.

39. The non-transitory computer-readable medium of claim 35, wherein causing a message to be transmitted comprises causing a push notification to be transmitted.

40. A system for handling a voice call to an alternate telephone number at a device having native voice call functionality, comprising:
a communications interface, configured to receive a message indicating that a voice call has been made from a caller to an alternate telephone number associated with the device;
a storage device, configured to store contact records;
a processor, communicatively coupled to the communications interface and the storage device, configured to, responsive to receiving the message, automatically alter a stored contact record associated with a pilot number;
a voice communication component, communicatively coupled to the processor, configured to receive a voice call forwarded to the device via a server using the pilot number; and
a display, communicatively coupled to the processor, configured to, responsive to receiving the call, automatically display information from the altered contact record;
wherein the voice communication component is further configured to, responsive to a user accepting the call, establish a voice connection to proceed with the voice call.

41. The system of claim 40, wherein the message further comprises caller identification pertaining to the caller.

42. The system of claim 41, wherein the caller identification comprises at least one selected from the group consisting of:
a caller telephone number; and
a caller name.

43. The system of claim 40, wherein establishing a voice connection to proceed with the voice call comprises establishing a voice connection between the caller and the device using the native voice calling functionality of the device.

44. The system of claim 40, wherein altering the stored contact record associated with the pilot number comprises altering the record to identify a call as being directed to an alternate number.

45. The system of claim 40, wherein altering the stored contact record associated with the pilot number comprises adding text to a name field in the record to identify a call as being directed to an alternate number.

46. The system of claim 40, wherein altering a stored contact record associated with the pilot number comprises altering an image in the record to include a graphical indication that a call was directed to an alternate number.

47. The system of claim 46, wherein the graphical indication comprises at least one selected from the group consisting of:

a logo;

a brand name;

a text indicator;

a distinctive visual attribute; and a distinctive color.

48. The system of claim 40, wherein altering a stored contact record associated with the pilot number comprises altering an image in the record to combine an image representing the caller with a graphical indication that a call was directed to an alternate number.

49. The system of claim 40, wherein the processor is further configured to, upon completion of the voice call, restore the stored contact record associated with the pilot number to its previous state.

50. The system of claim 40, wherein receiving a message comprises receiving a push notification.

51. The system of claim 40, wherein causing a display to automatically display information from the altered contact record is performed by the native voice calling functionality of the device.

52. At a server, a system for handling a voice call to an alternate telephone number, comprising:

a voice call component, configured to receive a call made from a caller to a telephone number;

a processor, communicatively coupled to the voice call component, configured to:

identify the called number as an alternate number associated with a device having native voice call functionality; and identify a registered number associated with the called alternate number; and a communications interface, communicatively coupled to the processor, configured to transmit a message from the server to the device associated with the alternate number, the message comprising an indication of the called alternate number, so as to enable the device to display an indication that the call was placed to the alternate number;

wherein the voice call component is further configured to, using a pilot number associated with the server, forward the voice call from the caller to the registered number.

53. The system of claim 52, wherein the message further comprises caller identification pertaining to the caller.

54. The system of claim 53, wherein the caller identification comprises at least one selected from the group consisting of:

a caller telephone number; and a caller name.

55. The system of claim 52, wherein forwarding the voice call from the caller to the registered number comprises establishing a connection to facilitate a voice call between the caller and the device.

56. The system of claim 52, wherein transmitting a message comprises transmitting a push notification.

\* \* \* \* \*